3,265,638
ELECTROLYTE COMPOSITION
Robert M. Goodman, Elkins Park, and Robert J. Gibson, Jr., Narberth, Pa., assignors to The Franklin Institute, Philadelphia, Pa., a corporation of Pennsylvania
No Drawing. Filed Mar. 24, 1964, Ser. No. 354,432
4 Claims. (Cl. 252—518)

The present invention relates to a novel electrolyte composition; and, more particularly, it relates to an electrolyte composition especialy adapted for use with electrodes applied to skin or tissue for measuring electrical effects in living organisms.

In measuring electrical effects of living organisms, such as potential differences between two points of a body or organ, galvanic skin resistance, and the like, electrodes, usually silver chloride plated onto silver, are applied to the skin or tissue. An electrolyte is employed to provide good electrical contact between each electrode and the skin or tissue. The electrolyte, which, in the past, has usually been a solution of sodium chloride, may range in viscosity from water thin to pastes or gels, depending upon the application and electrode configuration.

Electrical measurements of the type under consideration are of a low order of magnitude, the potentials involved ranging from several millivolts down to the order of millionths of a volt, as in electroencephalographic measurements.

We have found, however, that such measurements can be grossly inaccurate due to spurious electrical effects which we have traced to the nature of the electrolyte. Such spurious effects may range from a substantial proportion to many times the actual measurement being attempted. Moreover, the measurement can change quantitatively over a period of time due, we have found, to changes taking place within the electrolyte.

It is the principal object of the present invention to provide a novel electrolyte.

It is another object of the present invention to provide an improved electrolyte for use in conjunction with electrodes employed in making electrical measurements on living organisms.

It is a further object of the invention to provide an improved electrolyte, for use in conjunction with electrodes employed in making electrical measurements on living organisms as aforesaid, which gives true measurement of the electrical effect under consideration and which does not change in composition during extensive use.

These and other objects will become apparent from a consideration of the following specification and claims.

The electrolyte composition of the present invention consists essentially of an approximately 0.85–0.95% by weight, solution of sodium chloride in water, said solution being substantially saturated with silver chloride. In a preferred embodiment of the invention the viscosity of the solution is controlled beyond that of the simple water-thin liquid solution of sodium chloride and silver chloride, with polyvinyl alcohol.

The electrolyte composition of the present invention presents many important advantages over prior electrolytes. In the first place it is essentially isotonic, having a concentration of sodium chloride in the physiological saline range, and this gives rise to electrical—as well as physiological advantages. Being isotonic, the composition will minimize irritation of the skin or tissue when in contact for prolonged periods of time. Such irritation itself can cause spurious electrical effects as is illustrated by the known "wound potential." And being isotonic, no spurious electrical effects are generated at the skin or tissue-electrolyte interface. The composition is also essentially isoosmotic so that there is no tendency for the concentration of sodium chloride to change as would be the case if it differed from body fluids with which it comes into contact. Thus, the electrolyte composition is substantially in equilibrium with the body fluids. The electrolyte composition of the present invention is also substantially in equilibrium with the electrode by virtue of being substantially saturated with silver chloride. Hence, silver chloride on the electrode will not set up a couple with the electrolyte generating a spurious electrical effect. Nor will the silver chloride on the electrode dissolve into the electrolyte in such a manner as to change the electrolyte composition when current is being passed from an external source through the electrodes as in the measurement of galvanic skin resistance—thereby producing quantitative measurement changes with time. The present electrolyte compositions also have high electrical conductivity, in the neighborhood of 11,000 μmhos per cm. at 25° C.

As stated, the electrolyte composition is an approximately 0.85–0.95% by weight, sodium chloride solution in water, which solution is substantially saturated with silver chloride. The concentration of sodium chloride is in the "physiological saline" range; in fact physiological saline is preferably employed. While the water used is preparing the present electrolyte composition may be clean tap or spring water, it is advantageously essentially free of ions, that is it desirably has a resistivity of at least 2, preferably at least 3, megohm-centimeters. Distilled or deionized water, perferably distilled, deionized-water (water which has been deionized first and then distilled) are recommended. The water is also preferably sterile.

In preparing the electrolyte the sodium chloride is generally dissolved, in the desired concentration, in the water following which silver chloride is added. Since it is preferred that the electrolyte be completely saturated with silver chloride, silver chloride in excess of that soluble in the sodium chloride solution is generally added.

As stated, it is often desirable that the electrolyte have a viscosity somewhat higher than the simple water thin solution of sodium chloride and silver chloride. Polyvinyl alcohol has been found to be particularly suited for thickening the present composition, since it does not add extraneous ions, as is the case with many of the natural gums in their present state of purity, and does not ionize or salt out when warmed to body temperature, like certain salts of cellulose derivatives. The amount of polyvinyl alcohol, or equivalent thickening agent, employed will be dictated primarily by the degree of thickening desired which, in turn, depends upon variables such as the preference of the user, the nature of the electrodes, and the like. Thickening to the extent of forming a thick, non-flowing but plastic, gel which will not run out of electrodes during storage may be accomplished using polyvinyl alcohol. In this connection, borax (sodium tetraborate) aids polyvinyl alcohol in its thickening action. In general, the concentration of polyvinyl alcohol, when used, in the present composition need not exceed 7.5%. Variations in viscosity from above water-thin consistency to firm gels, using polyvinyl alcohol causes virtually no variation in conductivity. Another advantage in employing polyvinyl alcohol is the reduction in evaporation afforded thereby. Formation of a skin around the edges of the electrode has been noted, and this "self-sealing" feature prevents, or at least greatly retards, evaporation of water from the composition. Further in this connection, glycerine has also been found to aid in retarding evaporation.

Reference has been made above to sterility of the preferred electrolyte compositions. This, of course, can be achieved by boiling. In addition, however, it is desirable to incorporate an agent capable of preventing, at very low concentration, the growth of fungus on the composition and tolerated by the skin or tissue. Suitable fungicides in this regard are the phenates, like sodium orthophenylphenate and sodium pentachlorophenate. In this connection, a germicide may also be included in the composition, and an example of such a germicide is benzalkonium chloride.

It will be realized from the foregoing that the essential feature of the present invention is a composition which is substantially isotonic and isoosmotic as far as living skin and tissue are concerned, and therefore, in substantial equilibrium therewith, and which is also in substantial equilibrium with the silver-silver chloride electrode employed. The present composition will thus consist essentially of the stated components, or their equivalents, it being understood that this does not exclude the presence of other materials which do not materially alter deleteriously the advantageous characteristics of the described composition.

The invention will be more readily understood from a consideration of the following examples which are given for the purpose of illustration only and are not to be considered as limiting the scope of the invention in any way:

*Example I*

Six grams of polyvinyl alcohol (powder) are added to the vortex of 50 cc. of stirred silver chloride-saturated physiological saline (sterile, 0.15 N NaCl in distilled, deionized-water) at room temperature. The mixture is allowed to stand for 5 minutes after which it is heated, with agitation, in a boiling water bath until the polyvinyl alcohol is completely dissolved.

There are then mixed: 2 cc. of a solution prepared by dissolving 1 gram of "Dowicide A" of Dow Chemical Co. (97% sodium ortho phenyl phenate and 3% inerts) in 100 cc. of silver chloride-saturated distilled, deionized-water; 2 cc. of a solution prepared by dissolving 1 gram of "Dowicide G" of Dow Chemical Co. (79% of sodium pentachlorophenate, 11% of sodium salts of other chlorophenols and 10% inerts) in 100 cc. of silver chloride-saturated distilled, deionized water; 4 cc. of glycerine and 42 cc. of silver chloride-saturated physiological saline. This mixture, after heating to almost boiling, is added to the first solution, and the final mixture is held in a boiling water bath for ¼–½ hour until entrapped bubbles rise to the surface. The solution is then aseptically sealed in containers.

This electrolyte solution has an electrical conductivity of about 11,000 μmhos per cm. at 25° C., is particularly suited for rapid application to the skin or tissue and/or electrode surfaces, and is easy to handle.

*Example II*

The procedure of Example I is followed except that 30 cc. of the silver chloride-saturated physiological saline in which are mixed the fungicides and glycerine are replaced by 30 cc. of a solution prepared by dissolving .01 g. of sodium tetraborate per cc. of silver chloride-saturated physiological saline.

This forms a firm gel, also having an electrical conductivity at 25° C. of about 11,000 μmhos per cm. which is particularly suited for loading reservoir type electrode systems.

In the foregoing examples, any one or all of the fungicides, polyvinyl alcohol and glycerine can be omitted entirely.

Modification is possible in the selection of materials and their equivalents as well as in the exact amounts thereof without departing from the scope of the present invention.

What is claimed is:

1. An electrolyte composition, particularly adapted for use in conjunction with electrodes employed in making electrical measurements on living organisms, which consists essentially of an approximately 0.85–0.95%, by weight, solution of sodium chloride in water, said solution being substantially saturated with silver chloride and containing polyvinyl alcohol in an amount providing a viscosity above that of said aqueous solution of sodium chloride and silver chloride alone.

2. The composition of claim 1, wherein the water used is sterile and has a resistivity of at least 2 megohm-centimeters.

3. The composition of claim 2, wherein said water is distilled, deionized-water.

4. The composition of claim 1, wherein the silver chloride is in excess of that soluble in said sodium chloride solution.

References Cited by the Examiner

UNITED STATES PATENTS 3,027,333  3/1962  Friedman _____ 252—518

OTHER REFERENCES

Du Pont, "Elvanol," Polyvinyl Alcohols (1947), p. 6.
Kolthoff et al.: Textbook of Quantitative Inorganic Analysis, Macmillan Co. (1947), page 60.

LEON D. ROSDOL, *Primary Examiner.*

JULIUS GREENWALD, ALBERT T. MEYERS, *Examiners.*

J. D. WELSH, *Assistant Examiner.*